Patented Feb. 4, 1936

2,029,649

UNITED STATES PATENT OFFICE 2,029,649

REDUCING WATER FLOW IN OIL WELLS

Eugene E. Ayres, Pittsburgh, Pa., assignor to Gulf Research & Development Corporation, Wilmington, Del., a corporation of Delaware No Drawing. Application December 5, 1934, Serial No. 756,182

5 Claims. (Cl. 166—21)

This invention relates to reducing water flow in oil wells; and it comprises a method of shutting off water flow into oil wells penetrating wet formations wherein $CO_2$ under pressure is introduced into the well, the pressure being sufficient to cause it to penetrate into the wet formations to points remote from the well faces, the pressure is then released and a solution of a base, such as ammonia, is introduced under pressure; all as more fully hereinafter set forth and as claimed.

In deep oil wells passing through a variety of geological formations including water-bearing formations it is a practical problem of considerable importance to shut off or restrain flow of water into the well from wet formations without interfering with oil flow from oil formations. Many methods of treating the well have been proposed for sealing off purposes and some are in use; but the difficulty is mostly that the oil-delivering sands and crevices are plugged as well as those through which water passes. The shut-off means are not selective. For example, flows into a well can be stopped by mudding the well bore with plastic muds or cementing the walls with hydraulic cement. Such procedures effectively shut off all flows into the well. They make no discrimination between oil and water flows. To open up the face of the oil producing formation after such treatment it is necessary to blast off or otherwise remove the mud or cement sheath, and this opens up the water flow as well.

The present invention provides a means for shutting off water which is selective. Oil flows are substantially unaffected, while water flows are substantially stopped.

In the present invention $CO_2$, which may be the commercial liquefied gas in tanks, is introduced into the well under high pressure sufficient to cause the gas to penetrate the side walls and into surrounding strata. Sufficient time is given for this penetration. Carbon dioxid is more soluble in water than in oil, hence it generally penetrates farther into the water-bearing formations than into the oil formations. Most of the wet formations contain calcium and magnesium carbonate and the water is usually a brine containing calcium chlorid; frequently, also, magnesium chlorid. As the $CO_2$ under pressure penetrates these formations it takes up calcium and magnesium as soluble bicarbonates and probably, to a certain extent, reacts with calcium and magnesium chlorid. Under high pressure the carbonic acid formed by dissolved $CO_2$ is a considerably stronger acid than it is at lower pressures. On release of the pressure, that is with a drop in the $CO_2$ partial pressure, the bicarbonates come out of solution in flocky or gelatinous form, giving an efficient plugging. The further into the formation the $CO_2$ is caused to penetrate the more efficient is this action. At the walls or faces of the well, with a release of the $CO_2$ pressure, the water pressure tends to force out plugging matter, there being an abrupt pressure differential at this point. The further back in the formation the plugging material is located, the less is the pressure differential. Flocculent wet carbonates in the interior of the formation are more efficient than at the face.

There is a considerable gradient of $CO_2$ pressure between the well walls and points in the formation remote therefrom. Hence the concentration of $CO_2$ and carbonic acid at points far in the formations is less than that near the well walls. Accordingly at these remote points conditions are such that insoluble normal carbonates are largely formed directly in situ. This insures plugging in the region where it is most satisfactory: far inside the water formation.

In one way of operating, I complete the plugging operation by releasing pressure on the $CO_2$. The precipitated carbonates give effective plugging of the water formation. However, when the well brines contain chlorids, and HCl is formed even in small amounts, I generally arrange to neutralize the HCl to prevent any redissolving of the precipitated carbonates. Under such conditions after injection of the $CO_2$ I shut off the $CO_2$ and without releasing pressure I sweep $CO_2$ out of the well with a stream of air and inject into the well a solution of a base, or a material which forms a base in the presence of water. Ammonia gas or anhydrous liquid ammonia are suitable. Dilute water of ammonia is also suitable, and lime water and many other dilute basic liquids can be used. Injection is under pressure, the pressure usually being at least equal to that under which $CO_2$ is injected. As the base penetrates into the formation it neutralizes any HCl which may have been freed by interaction of $CO_2$ and magnesium chlorid or calcium chlorid. The net result is a further formation of flocculent plugging matter in the pores and crevices. When the well waters are alkaline, as is often the case, this extra step of positive neutralization is unnecessary.

When the described procedures are followed, none of the plugging actions take place in the oil filled pores and crevices; and the present method of shut off is therefore selective. The flow of oil into the well is not interfered with but the influx of water is shut off.

The water bearing formations through which an oil well passes are as a rule more or less calcareous in the sense that they contain calcium carbonate and magnesium carbonate; either or, and more usually, both.

In a specific example of the invention as applied to an oil well having oil-producing and water-producing sands adjacent the bore is treated to shut off the water flow without affecting oil production. The well waters in this example contain calcium and magnesium chlorids and the water sands are so-called calcareous sands containing calcium carbonate. A batch of 500 pounds $CO_2$ is introduced into the well from commercial cylinders of the liquefied gas and pumped into the bore and surrounding formations under high pressure. The $CO_2$ supply is now cut off and $CO_2$ in the well bore is swept out by a stream of air introduced into the well under substantially the same high pressure. If desired the operation may be completed at this stage by releasing pressure and allowing the well to produce. However, in this example it is advantageous to add the neutralizing step described. Accordingly, 100 pounds of liquefied anhydrous ammonia are forced into the well and surrounding formations under a pressure equal to or somewhat higher than the $CO_2$ pressure.

The ammonia supply is now shut off, pressure is released and the well allowed to produce. It is found that water flow into the well is practically stopped, the water sands being effectively plugged, while the oil flow is undiminished.

Most of the wet strata or formations through which an oil well passes are sufficiently calcareous to permit the $CO_2$ to exercise the described action; first dissolving calcium carbonate or magnesium carbonate, or both, as a bicarbonate under the prevailing pressure, and then redepositing the carbonate as a plugging material on release of pressure. In the event, however, that strata are encountered which are not sufficiently calcareous, the $CO_2$ solution can be charged with some dissolved bicarbonate by adding a little lime thereto. The $CO_2$ solution containing some calcium carbonate passes into the formation and on release of pressure deposits solid calcium carbonate as before, plugging pores.

The invention is equally applicable to shutting off water from wells producing natural gas, the procedure in this case being the same as described for oil wells.

What I claim is:—

1. A method of selectively shutting off water flow in an oil well penetrating oil formations and water formations wherein carbon dioxid is forced under high pressure into the well and the water formation in the presence of calcareous matter, the pressure being sufficient to overcome hydrostatic pressure in the water formation and to cause the carbon dioxid to penetrate far back in said formation, the carbon dioxid dissolving calcareous matter, and pressure is released, to deposit insoluble calcareous matter of increased bulk in the water formations, plugging them.

2. A method of selectively shutting off water flow in an oil well penetrating oil formations and calcareous water formations, wherein carbon dioxid is forced under high pressure into the well and the water formation, the pressure being sufficient to overcome hydrostatic pressure in the water formation and to cause the carbon dioxid to penetrate far back in said formation, the carbon dioxid dissolving in the well waters, bringing calcareous matter into solution and pressure is then released, to deposit insoluble carbonates of increased bulk in the water formations, plugging them.

3. A method of selectively shutting off water flow in an oil well penetrating oil and water formations, the water formation containing calcium chlorid, wherein carbon dioxid is forced into the well and surrounding formations under pressure, carbon dioxid is swept out of the well while pressure is maintained in the well and a base is forced into the well and the water formation so as to produce insoluble calcium carbonate in the water formation, and pressure is released.

4. The matter of claim 3 wherein the base is ammonia.

5. A method of selectively shutting off water flow in an oil well penetrating oil formations and water formations wherein an aqueous solution of carbon dioxid containing dissolved calcareous carbonates is forced under pressure into the well and the water formation, and pressure is then released, depositing insoluble calcareous carbonates in the water formations, plugging them.

EUGENE E. AYRES.